United States Patent [19]

DeLano et al.

[11] Patent Number: 5,396,604
[45] Date of Patent: Mar. 7, 1995

[54] SYSTEM AND METHOD FOR REDUCING THE PENALTY ASSOCIATED WITH DATA CACHE MISSES

[75] Inventors: Eric R. DeLano; Mark A. Forsyth, both of Fort Collins, Colo.

[73] Assignee: Hewlett-Packard Company, Palo Alto, Calif.

[21] Appl. No.: 729,132

[22] Filed: Jul. 12, 1991

[51] Int. Cl.⁶ ............................................. G06F 12/00
[52] U.S. Cl. ................................. 395/375; 364/243.4; 364/251.7; 364/260; 364/DIG. 1; 395/425
[58] Field of Search ........................ 395/425, 800, 375

[56] References Cited

U.S. PATENT DOCUMENTS

| 5,025,366 | 6/1991 | Baror | 395/425 |
| 5,109,524 | 4/1992 | Wagner | 395/800 |
| 5,146,603 | 9/1992 | Frost | 395/425 |

OTHER PUBLICATIONS

"CMOS PA-RISC Processor For a New Family of Workstations", by M. Forsyth et al., (IEEE COMPCOM Spring '91 Digest of Papers; Feb. 1991.
"System Design for a Low Cost PA-RISC Desktop Workstation", by R. Horning et al., (IEEE COMPCOM Spring '91 Digest of Papers; Feb. 1991.
"Architecture and Compiler Enhancements for PA-RISC Workstations", by D. Odnert et al., (IEEE COMPCOM Spring '91 Digest of Papers; Feb. 1991.

Primary Examiner—Eric Coleman

[57] ABSTRACT

A computer system having a central processor unit (CPU) with a reduced instruction set, a decoder and a data cache memory, for processing an instruction to retrieve data from a main memory to prevent a data cache miss. The system decodes an instruction requiring the CPU to load a value into a read only general purpose memory register, the instruction thereby indicating to the CPU to perform a prefetch operation and providing information corresponding to an address of the data to be fetched from the main memory. The system processes, substantially simultaneously, further instructions following the load register instruction and the prefetch operation by determining the address in main memory of the data to be prefetched using the information provided by the load instruction, fetching the data from the main memory, and storing the data in the data cache memory to permit accesses to the data and thereby reduce the penalty associated with a data cache miss.

14 Claims, 2 Drawing Sheets

SYSTEM AND METHOD FOR REDUCING THE PENALTY ASSOCIATED WITH DATA CACHE MISSES

DESCRIPTION

1. Technical Field

The present invention is directed to a system and method for avoiding or reducing the penalty associated with data cache misses. More particularly, the invention is directed to a technique for taking advantage of an existing load to general read only register instruction for prefetching data from main memory and storing it in a data cache memory before the data cache miss occurs.

2. Background Art

Most conventional computer systems include data cache memories. Data cache memories (d-caches) are much smaller and faster than main memory devices and are used to speed operations performed by the microprocessor. In order to achieve the speed necessary to aid in microprocessor performance, data cache memories are typically built using fast static random access memory circuits (SRAMs).

Conventional data cache memories, SRAMs for example, are limited in size because of cost and speed. The cost per bit of memory for cache memories is very high compared to main memory. Furthermore, to achieve the necessary speeds, the size of fast data storage cache memories must be kept small.

A data "hit" occurs when the required data is found in the data cache. Each time a piece of data required by some operation is not found in the data cache, a data cache "miss" occurs. When a data cache miss occurs, other instructions can execute, except when the general purpose register associated with the miss is used as an operand of a subsequent instruction. In this case, execution must cease until the cache miss is serviced.

Servicing of a cache miss is conventionally handled by first making room in data cache for the new data to be input, fetching the data from main memory, and then storing the data in the data cache. Once this is completed, subsequent instructions can be processed. The servicing of data cache misses is not frequent, but is very costly.

DISCLOSURE OF THE INVENTION

In a reduced instruction set code (RISC), the obvious goal is to reduce the sheer number and complexity of the instructions, and increase the frequency of operations to achieve higher throughput. A data cache prefetch mechanism in conjunction with the present invention (the present invention), achieves the same goal of a separate prefetch instruction, without the need for the instruction itself. The present invention provides a clean and easy technique to prefetch data into the data cache by issuing an existing LOAD_to_GR0 instruction.

Applications written using the LOAD_to_GR0 instruction to initiate data prefetches can also run on systems not designed to support the data prefetch mechanism. Hence, the present invention permits both backward and forward compatibility, which is not supported by systems using separate prefetch instructions.

The method according to the present invention operates on a computer system having a central processor unit (CPU) with a reduced instruction set, a decoder and a data cache memory, for processing a LOAD_to_GR0/prefetch instruction to retrieve data from a main memory to reduce the penalty associated with a data cache miss. By decoding an existing instruction requiring the CPU to load a value into a read only general purpose memory register, a prefetch operation can be inferred by the CPU.

The instruction also provides information corresponding to an address of the data to be fetched from the main memory. Limited types of subsequent instructions can be processed in parallel with the prefetch operation. Once the data is fetched from the main memory, it is stored in the data cache memory to permit accesses to the same address and thereby avoid or reduce the penalty associated with a data cache miss.

BRIEF DESCRIPTION OF THE DRAWINGS

The invention will be better understood if reference is made to the accompanying drawings in which.

BEST MODE FOR CARRYING OUT THE INVENTION

Figure 1:
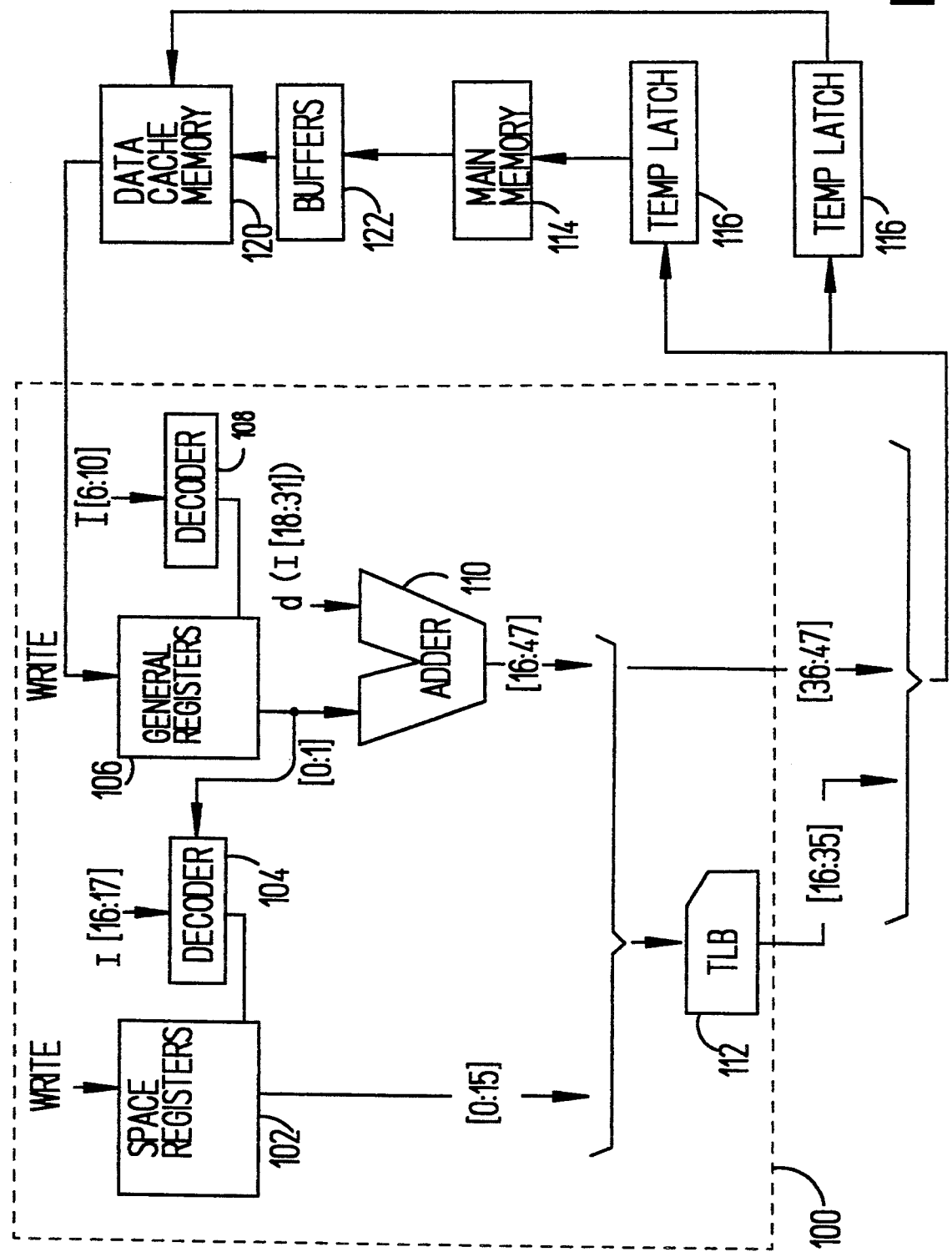
FIG. 1 is a block diagram showing hardware used to determine the real address of prefetch data in conjunction with the present invention.

An overall system which incorporates the present invention is generally described in an article by M. Forsyth et al. titled, "CMOS PA-RISC Processor For a New Family of Workstations," *IEEE COMPCOM Spring '91 Digest of Papers,* February 1991. The environment described in this article is only one of many computer systems in which the present invention could be used. Extensions to Hewlett-Packard's Precision RISC Architecture are described in an article titled, "Architecture and Compiler Enhancements for PA-RISC Workstations," D. Odnert et al., *IEEE COMPCOM Spring '91 Digest of Papers,* February 1991. Details of Hewlett-Packard's PA-RISC instruction set are publicly available, and may be found in the "Precision Architecture and Instruction Set Reference Manual," part no. 09740-90014. The Forsyth and Odnert articles and the PA-RISC manual are incorporated herein by reference as if set forth below in full.

The present invention is directed to a system and method which permit a data cache miss "to be serviced" in parallel with normal instruction execution. Hardware treats a load to general register 0 (zero) as a hint to fetch that cache line from memory and move it into the cache if it is not already present. It also is a hint to hardware that it should attempt to continue execution.

All writes to a general register 0 are ignored on Hewlett-Packard's PARISC, because general register 0 is a read only register. Thus it cannot be written to and the result of the load is never used. The cache prefetch operation allows the compiler to issue a cache line fetch early enough so that the data will be available when it is actually needed. A load to any read only register may be used in conjunction with the present invention to indicate the need for a data prefetch from main memory.

More specifically, a LOAD_to_GR0 (i.e., load the value to general purpose register zero), instruction is used to initiate servicing of a data cache miss. In many software applications, the programmer knows that there is a high probability of a data cache miss occurring. For instance, image processing and graphics applications process large amounts of data. In such cases, the programmer (or the compiler) can anticipate the need for new data and can issue a LOAD_to_GR0 instruction before the data is actually needed. Therefore, when a later instruction which accesses the same location in cache is issued, a cache "hit" will occur.

General Registers

Thirty-two 32-bit general registers provide the central resource for all computation (see Table 1). They are numbered GR0 through GR31, and are available to all programs.

TABLE 1

| General Registers. | |
|---|---|
| GR0 | Permant zero |
| GR1 | Target for ADDIL or General Use |
| GR2 | General use |
| . | |
| . | |
| GR30 | General use |
| GR31 | Link register for BLE or General Use |

GR0, GR1, and GR31 have special functions. GR0, when referenced as a source operand, delivers zeros. When GR0 is used as a destination, the result is discarded. GR1 is the target of the ADD IMMEDIATE LEFT instruction. GR31 is the instruction address offset link register for the base-relative interspace procedure call instruction (BRANCH AND LINK EXTERNAL). GR1 and GR31 can also be used as general registers. However, application software conventions may at time restrict their use.

Space Registers

Eight space registers, labeled SR0 through SR7, contain space identifiers for virtual addressing. Instructions specify space registers either directly in the instruction or indirectly through general register contents.

Instruction addresses, computed by branch instructions, may use any of the space registers. SR0 is the instruction address space link register for the base-relative interspace procedure call instruction (BRANCH AND LINK EXTERNAL). Data operands can specify SR1 through SR3 explicitly, and SR4 through SR7 indirectly, via general registers.

SR1 through SR7 have no special functions. Their use will normally be constrained by software conventions. For example, the following convention supports non-overlapping process groups. SR1 through SR3 provide general-use virtual pointers. SR4 tracks the instruction address (AI) space and provides access to literal data contained in the current code segment. SR5 points to a space containing process private data. SR6 points to a space containing data shared by a group of processes, and SR7 points to a space containing the operating system's public code, literals, and data.

Load Miss to GR0 Optimization

The present invention allows execution during the latency period of a cache miss in addition to the copying period of a cache miss, i.e., a LOAD_to_GR0, in effect, tells the cache/main memory subsystem to prefetch the line into cache memory without stalling the processor until the move-in to cache is completed.

Information necessary to determine the real address of the data to be prefetched is merely included in the LOAD_to_GR0 instruction. A virtual address is determined based on the information in the LOAD_to_GR0 instruction. The virtual address is then converted to a real address for the fetch from main memory in a conventional manner, as will become apparent to those skilled in the art.

The format for the PA-RISC LOAD WORD instruction includes 5 fields. These fields are shown below in Table 2.

TABLE 2

LOAD WORD.

| 12 | b | t | s | im14 |
|---|---|---|---|---|
| 6 | 5 | 5 | 2 | 14 |

The format for the LOAD WORD instruction is "LDW d(s,b),t ". The number below each field represents the size in bits of that filed. Each PA-RISC instruction is 32 bits long. Other instruction formats may also be employed, as will become apparent to those working in the art.

The function of the LOAD WORD instruction is to load a word into a general register. The aligned word is loaded into general register t from the effective address. The base field, b, plus description, d, forms the offset. The displacement is encoded into the im14 field.

The block diagram shown in FIG. 1 represents how hardware, operating in virtual mode, determines the real address of the data to be prefetched, once a LOAD_to_GR0 instruction is decoded. The present invention is equally applicable to a processor operating in real mode, as will become obvious to those skilled in the art.

A CPU is shown generally at 100. Only those elements of the CPU necessary for discussion of the present invention are shown. The general architecture and operation of CPUs are well known to those skilled in the art. Therefore, a detailed discussion of the CPU it self will be omitted.

Space registers 102 receive an address input from a first decoder 104. The decoder 104 decodes bits 16 and 17 (the s filed) of the LOAD_to_GR0 instruction, bases on bits 0 and 1 ([0:1 ]) of the output of general registers 106. The first 16 bits (bits [0:15]) are thereby output from one for the space registers 102, as discussed above with reference to the space registers. If bits 16 and 17 of the instruction are zero, the value 4 is added to the GR bits 0 and 1, therefore the contents of one of space registers 5, 6 or 7 is output. If bits 16 and 17 of the instruction are not zero, the contents of one of space registers 1, 2 or 3 is output.

The general registers 106 receive an address input from a second decoder 108. The decoder 108 is a common 32 bit decoder device which decodes the base bits 6 through 10 (5 total bits; $2^5=32$), of the instruction to access one of the 32 GR's. The output of the GR's 106 is added by an adder 110 to the displacement bits 18 through 31, to yield the remaining bits 16 through 47 of the 48 bit virtual address. Hence, the LOAD_to_GR0 instruction itself supplies the information needed to identify what data is to be prefetched before a data cache miss occurs.

The first 28 bits of the virtual address are sent to a translation lookaside buffer (TLB) 112. The TLB is used to convert the virtual address bits to physical (or real) address bits in a known manner. The first 12 real address bits are output by the TLB 112 and are combined with bits 36 through 47 of the virtual address, make up the entire 32 bit real address of the data in a main memory device 114.

Two temporary latches 116 are shown to representing the storing of the real address of the data pointed to by the load instruction. The address is sent to the main memory device 114 and a data cache memory device 120. The block labeled 122 represents buffer circuits on the CPU for transferring data from the main memory 114 to the cache memory 120. The function and structure of the circuitry used to implement the devices depicted in FIG. 1 are straight forward and will become evident to those skilled in the art.

A data cache miss is serviced by fetching a quantity of data from the main memory and writing it into the data cache memory 120. The following pseudo-code example shows how this can be taken advantage of by the system:
begin:
    "LOAD from address A to GR0"
    "Other instructions"
    "LOAD from address A to GRX"
end:

"Other instructions" refer to either: (1) Instructions which do not access the data cache (e.g., adds, multiplies, etc.), and/or (2) LOAD and STORE instructions which access the data cache, but do not access address "A", and does not miss in the data cache.

An advantage of the present invention is that other instructions can be executed at the same time a cache miss for the "LOAD from address A to GR0" is being executed. Normally, when a data cache miss occurs, other instructions can execute, except when the general purpose register associated with the miss is used as an operand of a subsequent instruction. Therefore, the present invention improves performance by effectively "hiding" the cache miss latency time.

Another benefit derived from the present invention results because PA-RISC defines GR0 as a "bit bucket." In other words, whenever a LOAD_to_GR0 occurs, GR0 is never actually written to, because GR0 always returns as a fixed value of zero (this is a requirement of the PA-RISC architecture). Contrastingly, if a similar prefetch mechanism was implemented using a command such as LOAD_to_GRX, where x≠0, (e.g., some other general purpose register is loaded), software would be required to avoid using GRX for any other calculations, thus tying up the register resource.

In addition, any hardware implementation which permits a data cache miss for a LOAD_to_GRX to occur while executing other instructions is more difficult to design. In order to implement such a prefetch command in hardware, the hardware must detect when GRX is used as an operand of subsequent instructions, and cease instruction execution when this occurs. Detecting these conditions in hardware is a costly proposition.

In the present invention, the LOAD_to_GR0 instruction is a preexisting instruction supported by the original PA-RISC architecture. The PARISC architecture does not defined LOAD_to_GR0 as being a prefetch instruction. The prefetch meaning has thus been in conjunction with the present invention, without the need of defining a new instruction.

Figure 2:
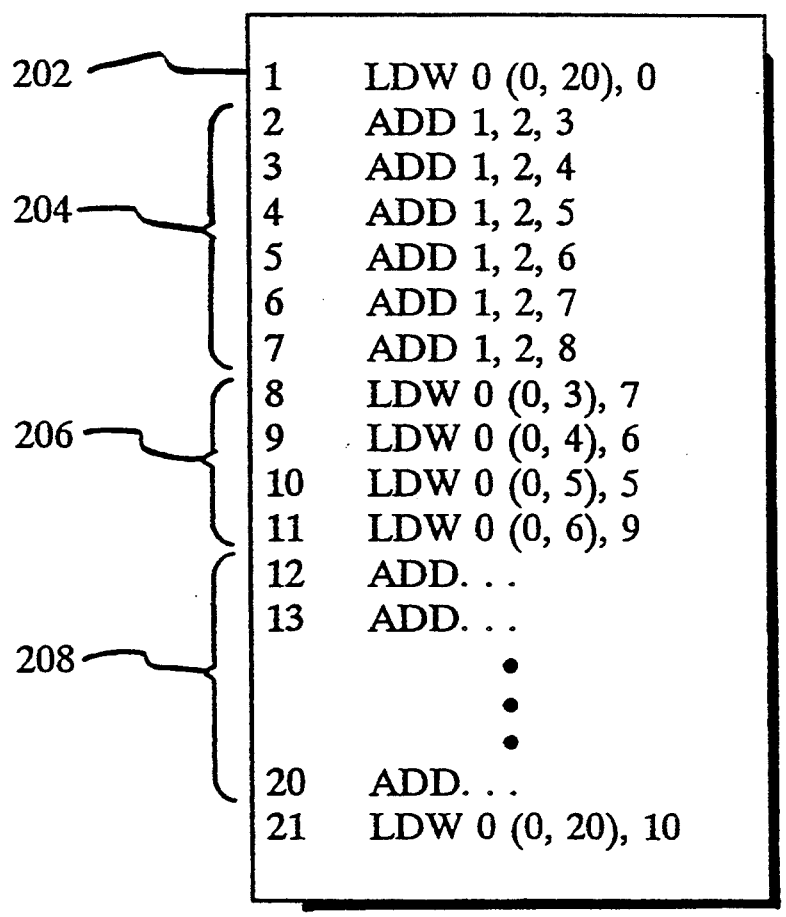
FIG. 2 is a time line diagram showing processing windows during a data prefetch operation in conjunction with the present invention.

In some cases, however, the processor stalls before the cache move-in completes. FIG. 2 shows processing windows during a data prefetch operation 202 in conjunction with the present invention. For a clean LOAD_to_GR0, data cache access instructions (e.g., loads and stores) which occur during the 6 states immediately after the LOAD_to_GR0 will get postponed until after this 6 state window. See the window 204 in FIG. 2, for example. After this 6 state window 204 there is a 4 state window 206 where any instruction (including loads and stores) may execute as long as no further data cache misses occur. Finally, after the 4 state window 206, there is a 9 state window 208 where execution proceeds until a data cache access instruction is encountered. Note that only the size of the middle window 206 will change as cache memory latency changes; the larger the latency, the larger the window becomes.

For CPU frequencies above 50 MHz the number of states of the window 206 will tend to go up; hence, the number of states that define the size of the windows in FIG. 2 depend on the speed of the CPU. For a dirty LOAD_to_GR0, any data access instruction in the 19 state window immediately proceeding this miss will suspend processor execution.

Subsequent accesses to this data will then "HIT" in cache and have no penalties or stalls due to cache misses. This option is most useful when:
1) Performing operations on large blocks of memory expected to have poor locality (high cache miss ratio), such as display lists;
2) The ratio of LOAD or STORE instructions to non-memory reference instructions in the loop is low so that premature stalling of the pipeline (due to the constrains mention above) does not substantially limit the performance gain; and
3) The addresses of the data which will be needed can be determined far in advance of when the data will actually be needed so that the prefetch can be completed before referencing a given address (any sequential blocks of memory, for example).

The clear miss and dirty miss cases process as follows:
Clean Miss Case:
LD(addr)→GR0
    6 states of non data cache transaction instructions
    4 states of any non-"Missing" transaction instructions
    9 states of non data cache transaction instructions
    Load or store here to address "addr" will not have a cache miss.
Dirty Miss Case:
Optimal Coding is as follows:
    LD→GR0
    19 states of non data cache transaction instructions
    Load or store here to address "addr" will not have a cache miss.

Any application must be modified to include the LOAD_to_GR0 in the appropriate places to receive any benefit from it, as will become evident to those skilled in the art.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. It will be understood by those skilled in the art that various changes in form and detail may be made therein without departing from the spirit and scope of the invention.

Having thus described our invention, what we claim as new and desire to secure by Letters Patent is:

1. In a computer system having a central processor unit (CPU) with a reduced instruction set, a decoder and a data cache memory, a computer-implemented method for servicing a data cache miss in parallel with normal instruction execution to thereby reduce or avoid the penalty associated with a data cache miss, comprising the steps of:

placing a first instruction that requires a load to a read only register within an instruction stream, wherein said first instruction provides a hint to the data cache memory to prefetch a cache line from a main memory into the data cache memory;

decoding and executing said first instruction, wherein said load to said read only register does not alter the contents of said read only register; and processing, substantially simultaneously with said prefetch of said cache line, further instructions that follow said first instruction;

whereby said first instruction is placed within said instruction stream such that said cache line is prefetched from said main memory early enough so that subsequent accesses to this data will not result in a data cache miss.

2. A method according to claim 1, wherein said prefetch operation further comprises the steps of:

(a) determining said address in main memory of said data to be prefetched using said information provided by said load instruction;

(b) fetching said data from the main memory; and (c) storing said data in the data cache memory to permit accesses to the data and thereby reduce the penalty associated with a data cache miss.

3. A method according to claim 2, wherein said decoding step decodes a LOAD_to_GRX instruction, where GRX represents the read only general purpose memory register, thereby permitting further registers to serve as operands.

4. A method according to claim 2, wherein said determining step further comprises the steps of:

(i) determining the virtual address of the data; and (ii) converting said virtual address to the real address in the main memory.

5. A computer system having a central processor unit (CPU) with a reduced instruction set, a decoder and a data cache memory, the system adapted to service a data cache miss in parallel with normal instruction execution to thereby reduce or avoid the penalty associated with a data cache miss, comprising the steps of:

first means for decoding a first instruction that requires a load to a read only register, wherein said first instruction provides a hint to the data cache memory to prefetch a cache line from a main memory into the data cache memory, wherein said load to said read only register does not alter the contents of said read only register; and second means for processing, substantially simultaneously with said prefetch of said cache line, further instructions following said first instruction;

whereby said first instruction allows said cache line to be prefetched from said main memory early enough so that subsequent accesses to this data will not result in a data cache miss.

6. A system according to claim 5, wherein said first means further comprises:

(a) means for determining said address in main memory of said data to be prefetched using said information provided by said load instruction;

(b) means for fetching said data from the main memory; and (c) means for storing said data in the data cache memory to permit accesses to the data and thereby reduce the penalty associated with a data cache miss.

7. A system according to claim 6, wherein said instruction is a LOAD_to_GRX instruction, where GRX represents a read only general purpose memory register, thereby permitting further registers to serve as operands.

8. A system according to claim 6, wherein said third means further comprises:

(i) means for determining the virtual address of the data; and (ii) means for converting said virtual address to the real address in the main memory.

9. A system according to claim 6, wherein said CPU operates in real mode to determine said address in the main memory of said data to be prefetched using said information provided by said load instruction, fetches said data from the main memory, and stores said data in said data cache memory to permit accesses to said data and thereby reduce the penalty associated with a data cache miss.

10. A system according to claim 9, wherein said instruction is a LOAD_to_GRX instruction, where GRX represents a read only general purpose memory register.

11. A system according to claim 6, wherein said CPU further determines the virtual address of the data, and converts said virtual address to the real address in the main memory using a translation lookaside buffer.

12. In a computer system having a data cache memory, a method for reducing or avoiding the penalty associated with a data cache miss, comprising the steps of:

(1) executing a first load instruction that requires a load to a read only register, said first load instruction functions as a hint to prefetch a cache line from memory, wherein said load to said read only register does not alter the contents of said read only register;

(2) executing a stream of instructions following said load instruction, wherein the processing of said prefetch is done in parallel with said executing of said stream of instructions;

(3) executing a second load instruction that uses dam from said cache line fetched from memory;

wherein said first load instruction is placed within said stream of instructions to allow the system to retrieve said cache line early enough so that the data will be available when it is actually needed by said second load instruction.

13. In a computer system having a data cache memory, a method for reducing or avoiding the penalty associated with a data cache miss, comprising the step of:

providing, for decoding and execution, an instruction within a stream of instructions that requires a load to a read only register, wherein said instruction provides a hint to the data cache memory to prefetch a cache line from a memory into the data cache memory, wherein said load to said read only register does not alter the contents of said read only register;

wherein said instruction allows execution of subsequent instructions within said stream of instructions during the latency period of said prefetch of said cache line from said memory;

wherein said instruction is placed within said stream of instruction to allow said cache line to be prefetched from said memory early enough so that subsequent accesses to this data will not result in a data cache miss.

14. The method of claim 13, wherein said instruction is provided in said stream of instructions by a compiler.

* * * * *